United States Patent [19]

Iida et al.

[11] Patent Number: 4,888,212

[45] Date of Patent: Dec. 19, 1989

[54] PROCESS FOR THE PREPARATION OF MAGNETIC RECORDING MEDIUM

[75] Inventors: Shinobu Iida; Masaaki Fujiyama; Shigeo Komine; Keisuke Yamada, all of Kanagawa, Japan

[73] Assignee: Fuji Photo Film Co., Ltd., Kanagawa, Japan

[21] Appl. No.: 107,824

[22] Filed: Oct. 14, 1987

[30] Foreign Application Priority Data

Oct. 14, 1986 [JP] Japan ................................. 61-243553
Oct. 14, 1986 [JP] Japan ................................. 61-243554

[51] Int. Cl.$^4$ .............................................. B05D 5/12
[52] U.S. Cl. .................................... 427/130; 427/131
[58] Field of Search ............................... 427/130, 131

[56] References Cited

U.S. PATENT DOCUMENTS 2,688,567  9/1954  Franck ................................... 117/64

Primary Examiner—Bernard Pianalto
Attorney, Agent, or Firm—Sughrue, Mion, Zinn, Macpeak & Seas

[57] ABSTRACT

A process for the preparation of a magnetic recording medium comprises the steps of subjecting a magnetic recording layer coated on a nonmagnetic support to surface smoothening treatment, the magnetic recording layer comprising a ferromagnetic powder dispersed in a binder, and then grinding both a surface of the magnetic recording layer and a surface of a back layer provided on the support using a specific grinder. The specific grinder is a fixed blade, a diamond wheel or a rotatable blade. A rotatable blade-grinder preferably employable for the grinding procedure comprises a rotatable body having a circular section and one or more blades provided on the periphery of the body.

8 Claims, 2 Drawing Sheets

PROCESS FOR THE PREPARATION OF MAGNETIC RECORDING MEDIUM

BACKGROUND OF THE INVENTION

1. Field of the Invention

The present invention relates to a process for the preparation of a magnetic recording medium improved in running endurance and a different grinders preferably, employable for the same.

2. Description of Prior Art

A magnetic recording medium comprising a nonmagnetic support and a magnetic recording layer provided thereon is used as an audio tape, a video tape, or a recording medium for a computer system. The magnetic recording layer comprises a binder and a ferromagnetic powder dispersed therein.

The magnetic recording medium is generally prepared by the following process. A binder such as a resin component and a ferromagnetic powder are dispersed in a solvent to prepare a magnetic paint, and the magnetic paint is coated over a nonmagnetic support to form a layer of the magnetic paint on the nonmagnetic support. The coated layer of the magnetic paint is then subjected to various treatments such as magnetic orientation, drying treatment and surface smoothening treatment. Subsequently, the sheet having been subjected to such treatment steps is cut or slit into a desired shape to prepare a desired magnetic recording medium.

It is though that the particles of the ferromagnetic powder are firmly kept in the recording layer of the magnetic recording medium prepared as above and the magnetic recording layer has a very smooth surface. According to studies of the present inventors, however, it has been confirmed that some particles of the ferromagnetic powder are insufficiently fixed to the recording layer and merely deposited on the surface of the recording layer. These insufficiently fixed ferromagnetic particles easily separate (drop off) from the recording layer and deposit on the surface of a magnetic head in the course of running procedure, to cause clogging on the head. Further, these particles sometimes cause occurrence of drop-out in the case of a video tape, etc.. Moreover, such separation of the ferromagnetic powder from the recording layer reduces the amount of the ferromagnetic powder present in the vicinity of the surface of the magnetic recording layer, so that the resulting magnetic recording medium is lowered in the electromagnetic conversion characteristics (i.e., lowering of output level occurs) after repeated uses.

For solving the above-mentioned various problems such as occurrence of drop-out, clogging on a magnetic head and lowering of output level, the present inventors have invented a method of grinding the surface of a magnetic recording layer by means of a grinder and applied for a patent with respect to the method (U.S. Pat. Ser. No. 007,216).

According to the method, the surface of the magnetic recording layer which has been subjected to a surface smoothening treatment is ground by means of a grinder of high hardness such as a diamond wheel or a fixed sapphire blade to remove particles of the ferromagnetic powder easily dropping off from the recording layer or material deposited on the surface of the recording layer, so as to prevent separation of those particles and material from the recording layer in the course of running procedure. By grinding the surface of the magnetic recording layer as described above, various disadvantages such as occurrence of drop-out or clogging on the head and lowering of output level after running of the medium for a long period of time are effectively prevented.

A magnetic recording medium may have a back layer (i.e., backing layer) comprising a binder and a nonmagnetic powder dispersed therein on the free surface of the nonmagnetic support (surface on which the magnetic recording layer is not provided) for improving running properties. The present inventors have also confirmed that the magnetic recording medium having a back layer tends to increase in occurrence of drop-out or clogging on a magnetic head as compared with a magnetic recording medium having no back layer, though the medium shows almost the same level as that having no back layer in lowering of output after repeated running by grinding the surface of the magnetic recording layer. That is, as for the magnetic recording medium having been ground on the surface of the magnetic recording layer, the back layer provided for improving running endurance does not function satisfactorily from the viewpoints of reduction of occurrence of drop-out and prevention of clogging on a head.

SUMMARY OF THE INVENTION

It is an object of the present invention to provide a novel process for the preparation of a magnetic recording medium improved in running endurance.

It is another object of the invention to provide a novel grinder favorably employable for preparing a magnetic recording medium having high running endurance.

There is provided by the present invention a process for preparing a magnetic recording medium which comprises the steps of subjecting a magnetic recording layer coated on a nonmagnetic support to surface smoothening treatment, said magnetic recording layer comprising a ferromagnetic powder dispersed in a binder, and then grinding the surface of said magnetic recording layer by bringing the surface of the magnetic recording layer into contact with a specific grinder selected from the group consisting of a fixed blade, a diamond wheel or a rotatable blade, said grinder comprising a rotatable body having a circular section and at least one blade provided on the periphery of said body.

The invention further provides a rotatable blade-grinder comprising a rotatable body having a circular section and at least one blade provided on the periphery of said rotatable body, preferably along the rotation axis.

The invention further provides a process for preparing a magnetic recording medium which comprises the steps of subjecting the above-mentioned magnetic recording layer coated on a nonmagnetic support to surface smoothening treatment, and grinding the smoothened surface of the magnetic recording layer and a surface of a back layer provided on another surface of the nonmagnetic support by means of a grinder made of a material of high hardness.

Employment of the specific grinder of the present invention makes it possible to effectively grind (shave) the surface of the magnetic recording layer. Accordingly, particles of the ferromagnetic powder easily separating (i.e., dropping off) from the surface of the recording layer are reduced, so that a magnetic recording medium less producing clogging on a magnetic head or dropout caused by the separated particles in the course of running procedure can be prepared. Further, since the particles of the ferromagnetic powder are hardly dropped off from the surface of the recording layer and hence the amount of the ferromagnetic powder hardly decreases even after repeated running, a magnetic recording medium showing reduction of variation of reproduction output between the initial running and after the repeated running can be prepared.

Grinding of the surface of the back layer can also serve to prepare a magnetic recording medium having high running endurance. In detail, particles of the nonmagnetic powder easily dropping off from the surface of the back layer are almost removed, so that it is hardly brought about that the particles of nonmagnetic powder drop off from the back layer to deposit on the surface of the magnetic recording layer even in the case where the surface of the recording layer is in contact with the back layer such as in the case of using the recording medium in the wound state. Hence, the resulting recording medium suffers less clogging on a magnetic head and drop-out caused by the deposited particles.

In the case of using a curing agent as a component of the magnetic recording layer or the back layer, most of unreacted curing agent is removed from the surface of the recording layer or the back layer by the grinding procedure of the invention, so that the resulting magnetic recording medium is almost free from adhesion of dust, etc. to its both surfaces. Hence, a magnetic recording medium suffering less occurrence of drop-out caused by such deposit is obtained. In addition, a magnetic head is hardly stained with the unreacted curing agent, etc., so that a magnetic recording medium almost free from clogging on the head which is caused by deposition of dust on the head can be prepared.

DETAILED DESCRIPTION OF THE INVENTION

Figure 1:
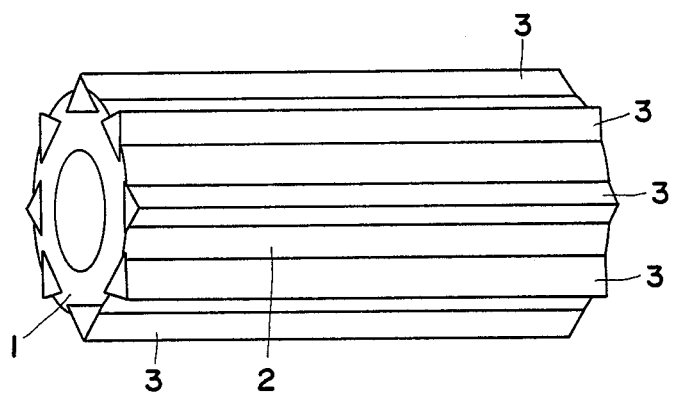
FIG. 1 is a perspective view showing an example of a rotatable blade-grinder of the present invention.

A magnetic recording medium is generally prepared by coating a magnetic paint over a nonmagnetic support to form a magnetic recording layer on the support, subjecting the magnetic recording layer to various treatments such as magnetic orientation, curing treatment and surface smoothening treatment, and then cutting or slitting the resulting sheet into a desired shape. The magnetic recording medium comprises a nonmagnetic support and a magnetic recording layer provided on the support. The magnetic recording layer comprises a binder and a ferromagnetic powder dispersed therein, and the binder comprises a resin component. A curing agent may be incorporated into the binder, if desired.

The provision of the magnetic recording layer on the nonmagnetic support can be done according to a conventional manner. For instance, a resin component and a ferromagnetic powder (and a curing agent and an abrasive, if desired) are kneaded and dispersed in a solvent to prepare a magnetic paint, and the magnetic paint is then coated over the nonmagnetic support to form a magnetic recording layer on the support.

The resin component in the magnetic paint can be selected from those conventionally employed. Examples of the resin component include vinyl chloride copolymers (e.g., vinyl chloride/vinyl acetate copolymer, vinyl chloride/vinyl acetate/vinyl alcohol copolymer, vinyl chloride/vinyl acetate/maleic anhydride copolymer, vinyl chloride/vinyl acetate/acrylic acid copolymer, vinylidene chloride/vinyl chloride copolymer, vinyl chloride/acrylonitrile copolymer, ethylene/vinyl acetate copolymer, and vinyl chloride copolymer incorporated with a polar group such as $-SO_3Na$ or $-SO_2Na$ and an epoxy group), cellulose derivatives such as nitrocellulose, acrylic resin, polyvinyl acetal resin, polyvinyl butyral resin, epoxy resin, phenoxy resin, and polyurethane resin (e.g., polyester polyurethane resin, polyurethane resin incorporated with a polar group such as $-SO_3Na$ or $-SO_2Na$, and polycarbonate polyurethane resin).

In the case of incorporating a curing agent into the binder, a polyisocyanate compound is generally employed as the curing agent. The polyisocyanate compound employable in the invention can be selected from those generally used as a curing agent such as those used for curing a polyurethane resin. Examples of the polyisocyanate compound include a reaction product of 3 moles of tolylene diisocyanate and 1 mole of trimethylolpropane (e.g., Desmodule L-75 available from Bayer AG), a reaction product of 3 moles of diisocyanate (e.g., xylylene diisocyanate or hexamethylene diisocyanate) and 1 mole of trimethylolpropane, a buret adduct compound of 3 moles of hexamethylene diisocyanate, an isocyanurate compound of 5 moles of tolylene diisocyanate, an isocyanurate adduct compound of 3 moles of tolylene diisocyanate and 2 moles of hexamethylene diisocyanate, isophorone diisocyanate, and a polymer of diphenylmethane diisocyanate.

If a curing treatment is carried out by means of irradiation of electron rays, there can be employed a compound having two or more reactive double bond such as vinyl chloride copolymer acrylate and urethane acrylate as the curing agent.

In the invention, it is preferred to employ a resin having high hardness such as a vinyl chloride copolymer in combination with a resin having low hardness such as a polyurethane resin. In the case of using the combination of a resin having high hardness such as a vinyl chloride copolymer and a resin having low hardness such as a polyurethane resin as the resin component, the ratio between the former and the latter is generally in the range of from 9:1 to 5:5, preferably in the range of from 9:1 to 6:4, by weight.

The ratio between the above-mentioned resin component and the curing agent is generally in the range of from 9:1 to 5:5 (resin component:curing agent), preferably in the range of from 9:1 to 6:4, by weight.

In the case of using a ferromagnetic powder having low hardness, a larger amount of binder is generally used than the case of using a ferromagnetic powder having high hardness such as $\gamma$-$Fe_2O_3$. In this case, the amount of the flexible resin such as a polyurethane resin is generally increased.

If the amount of the polyurethane resin is increased as described above, the binder is apt to soften, so that the curing agent such as a polyisocyanate compound is generally used in a large amount to sufficiently cure the binder.

In the case of using a polyurethane resin as the resin component and a polyisocyanate compound as the curing agent, the ratio between the former and the latter is preferably in the range of from 1:0.8 to 1:2, more preferably in the range of from 1:1 to 1:5, by weight. By setting to the above-mentioned ratio in this range, the binder is effectively prevented from softening which is caused by the employment of the polyurethane resin even in the case of using a ferromagnetic metal powder having low hardness.

The total amount of the resin component and the curing agent is generally in the range of 10–100 parts by weight, preferably 15–40 parts by weight, based on 100 parts by weight of the ferromagnetic powder employed.

As a ferromagnetic powder employable in the invention, there can be mentioned a metal oxide-type ferromagnetic powder such as $\gamma$-$Fe_2O_3$, a modified metal oxide-type ferromagnetic powder such as $\gamma$-$Fe_2O_3$ containing other component such as cobalt, and a ferromagnetic metal powder containing a ferromagnetic metal such as iron, cobalt or nickel.

It is advantageous to apply the process of the present invention to the preparation of a magnetic recording medium comprising Co-containing $\gamma$-$Fe_2O_3$ or a ferromagnetic metal powder. Because the deposited component or dust on a magnetic recording layer or a magnetic head can be reduced in spite of using a large amount of curing agent, and accordingly the resulting magnetic recording medium less produces drop-out phenomenon and hardly brings about clogging on the head.

The ferromagnetic metal powder employable in the invention may contain iron, cobalt or nickel, and has a specific surface area (S-BET) of not less than 42 $m^2/g$, preferably not less than 45 $m^2/g$.

As a typical ferromagnetic metal powder, there can be mentioned a ferromagnetic alloy powder containing a metal component of at least 75 wt. % in which at least 80 wt. % of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the reamining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide.

Processes for the preparation of the above-mentioned ferromagnetic powders are already known, and the ferromagnetic powder employed in the invention can be prepared by the known processes.

There is no specific limitation with respect to the shape of the ferromagnetic powder employable in the present invention, but generally used is a ferromagnetic powder in a needle shape, a grain shape, a dice shape, a rice shape or a plate shape. Preferably employed is a ferromagnetic powder in a needle shape.

The above-mentioned resin component, curing agent and ferromagnetic powder are kneaded and dispersed in a solvent conventionally used in the preparation of a magnetic paint (e.g., methyl ethyl ketone, dioxane, cyclohexanone or ethyl acetate) to prepare a magnetic paint. Kneading and dispersing those components can be carried out according to a conventional manner.

The magnetic paint may contain other known additives such as an abrasive (e.g., $\alpha$-$Al_2O_3$ and $Cr_2O_3$), an antistatic agent (e.g., carbon black), a lubricant (e.g., fatty acid, fatty acid ester and silicone oil) and a dispersing agent, or a filler in addition to the above-mentioned components. As the lubricant, a saturated fatty acid having 10–22 carbon atoms is preferably employed, because the saturated fatty acid is apt to be oriented in the form of layer on the surface of the magnetic recording layer through the grinding treatment using a rotatable blade-grinder (described hereinafter), and the layer of thus oriented fatty acid has high physical strength and high lubricity. As a result, the resulting magnetic recording medium is improved in running properties.

The magnetic paint prepared as above is coated over a nonmagnetic support. The coating of the magnetic paint over the support can be done by a known method such as a method of using a reverse roll. The magnetic paint is coated in such a manner that the magnetic recording layer of the resulting recording medium would have thickness of 0.5–10 $\mu$m.

As a material of the nonmagnetic support, there can be mentioned those conventionally employed. The thickness of the nonmagnetic support is generally in the range of 3 to 50 $\mu$m, preferably in the range of 5 to 30 $\mu$m.

The nonmagnetic support may have a back layer (i.e., backing layer) on the opposite side of the side where a layer of the magnetic paint is to be coated.

The back layer can be formed on the nonmagnetic support in a similar manner to that for the formation of a magnetic recording layer. For example, a particulate component such as a nonmagnetic powder and a binder is dispersed in an organic solvent to prepare a coating solution for the formation of a back layer. The coating solution is applied onto the surface of the nonmagnetic support where the magnetic recording layer is not provided by a conventional method such as a method of using a reverse roll. The coated layer is then dried to form a back layer on the nonmagnetic support.

As the nonmagnetic powder, there can be mentioned a known particulate filler employed for a conventional back layer. Examples of the nonmagnetic powder include carbon black (mean particle size: 10–600 m$\mu$), graphite (mean particle size: 0.1–1 $\mu$m) and an inorganic filler (e.g., $\alpha$-$Al_2O_3$, $Cr_2O_3$, $SiO_2$, $TiO_2$, TiO, ZnO, CaO, ZnS, $MoS_2$, $BaSO_4$, $CaSO_4$, $MgCO_3$ and BN). They can be employed singly or in combination. In the present invention, preferably employed is a combination of carbon black and $\alpha$-$Al_2O_3$. In this case, the ratio between carbon black and $\alpha$-$Al_2O_3$ is preferably in the range of 5:1 to 50:1 (carbon black: $\alpha$-$Al_2O_3$), by weight.

The nonmagnetic powder is generally employed in an amount of 20 to 500 parts by weight based on 100 parts by weight of the binder contained in the back layer.

The binder for the back layer can be selected from known resins employed for a conventional back layer, and the resin component of the binder can be selected from those employed in the preparation of the aforementioned magnetic recording layer. Preferred examples of the resin component employable for the formation of a back layer include vinyl chloride copolymers, polyurethane resins, cellulose derivatives and vinylidene chloride copolymers. Among them, particularly preferred are cellulose derivatives and polyurethane resins.

A curing agent is preferably contained in the binder of the back layer for enhancing mechanical or physical strength of the back layer. The curing agent can be selected from those used in the preparation of the aforementioned magnetic recording layer. The amount of the curing agent can be appropriately determined in the conventional range. For example, in the case of using a polyurethane resin as the resin component, the curing agent is generally employed in the same amount or an amount of less than that of the polyurethane resin.

The back layer can be provided on the nonmagnetic support by dispersing the above-mentioned nonmagnetic powder and resin component (and further the curing agent, if desired) in an organic solvent to prepare a coating solution, and applying the coating solution onto the surface of the nonmagnetic support where the recording layer is not provided by a conventional method such as a method of using a reverse roll. The coating of the solution is done in such a manner that the resulting back layer would have a thickness of not larger than 1.5 μm, preferably in the range of 0.2 to 1.2 μm.

An adhesive layer may be provided between the nonmagnetic support and the magnetic recording layer and/or between the nonmagnetic support and the back layer.

The coated layer of the magnetic paint is generally subjected to a treatment of orienting the ferromagnetic powder contained in the magnetic paint-coated layer, that is, a magnetic orientation, and then subjected to a drying process.

After the drying process is complete, the magnetic paint-coated layer is preferably subjected to a surface smoothening process. The smoothening process is carried out, for example, using a supercalender roll, etc. The supercalender roll comprises a mirror surface roll and a cotton roll alternately arranged, and the smoothening process is performed by passing the laminated sheet between those rolls under condition that the surface of the magnetic paint-coated layer is in contact with the mirror surface roll. Through the surface smoothening process, voids having been produced in the magnetic paint-coated layer by removing the solvent in the drying process are filled with the ferromagnetic powder to increase a filling ratio of the ferromagnetic powder in the magnetic paint-coated layer, whereby a magnetic recording medium having high electromagnetic conversion characteristics is obtained.

The surface of the magnetic recording layer having been subjected to the surface smoothening process is ground or shaved by means of a rotatable blade-grinder of the present invention. Further, the surface of the back layer is preferably ground by a grinder. The grinding procedure can be performed after a sheet having the magnetic recording layer is cut or slit.

In the case of using a curing agent as a component of the binder of the magnetic recording layer or the back layer, not smaller than 90 wt. % of the employed curing agent is contained in the magnetic recording layer or the back layer in the unreacted state at the above-mentioned stage, so that the magnetic recording layer or the back layer is preferably subjected to the following curing treatment to cause the curing agent to react in an amount of not smaller than 50 wt. %, preferably not smaller than 80 wt. %, of the whole amount, and then subjected to the grinding process.

As the curing treatment, there are two treatments of a heat curing treatment and a curing treatment by means of irradiation with electron rays (namely, an electron rays exposure-curing treatment). In the invention, any of those treatments can be utilized.

Through the curing treatment, the unreacted curing agent such as a polyisocyanate compound contained in the magnetic recording layer having been subjected to the surface smoothening process reacts with a resin component such as vinyl chloride copolymer and polyurethane resin to form a three dimensionally-crosslinked structure.

Processes for the heat curing treatment are already known, and the known processes can be applied to the present invention. For instance, the heating curing treatment is generally carried out under the conditions of a temperature of not lower than 40° C. (preferably in the range of 50° to 80° C.) and a period of not shorter than 20 hours (preferably from 24 hours to 7 days).

Processes for the electron rays exposure-curing treatment are already known, and the known processes can be employed in the present invention.

The laminated sheet comprising the nonmagnetic support and the magnetic recording layer having been subjected the curing process is then slit or cut into a desired shape.

The procedure for slitting or cutting the sheet is generally done by a conventional method using a conventional cutting machine such as a slitter.

As described above, the laminated sheet is ground or shaved on the surface of the magnetic recording layer using the rotatable blade-grinder.

The rotatable blade-grinder can be employed for grinding the surface of the back layer. However, other grinders of high hardness can be also employed for grinding the back layer. Examples of other grinders include a fixed blade and a diamond wheel. The fixed blade has a material of high hardness on its part (e.g., edge) to contact the back layer. Examples of the material of high hardness include sapphire, alumina, cermet, zirconia (zirconium oxide), silicon nitride, silicon carbide, diamond and hard alloys. The diamond wheel means a rotatable grinder in the form of cylinder having a sintered diamond on its outer surface.

In the case of subjecting the surface of the back layer to the grinding treatment, the surface of the magnetic recording layer may be ground using a grinder made of a material of high hardness other than the rotatable blade-grinder.

By grinding both of the surface of the magnetic recording layer and the surface of the back layer using the rotatable blade-grinder, there can be prepared a magnetic recording medium having high running endurance which hardly suffer from clogging on a magnetic head, lowering of output level even after running of long period of time and occurrence of drop-out.

FIG. 1 is a perspective view showing an example of the rotatable blade-grinder.

As shown in FIG. 1, the rotatable blade-grinder comprises a rotatable body 1 and at least one blade 3 provided on the periphery 2 of the rotatable body along the axis of rotation. The rotatable body 1 has a vertical section of circular shape against the rotating axis, and generally is in the form of cylinder. The circular section of the rotatable body 1 generally has a diameter of 10 to 50 mm. The length of the rotatable body can be appropriately determined according to the width of a magnetic recording medium sheet (from which a number of magnetic recording tapes are obtained by slitting) to be ground. For example, the length of the body is generally as much as 1.1 to 10 times of the width of the magnetic recording medium sheet to be ground.

As a material of the rotatable body, metals such as iron, brass and stainless steel are generally employed.

On the periphery 2 of the rotatable body is necessarily provided at least one blade, and the number of the blade preferably is in the range of 2 to 32, more preferably in the range of 2 to 10. The blade is provided on the periphery 2 of the rotatable body along the direction of the rotation axis of the body, and generally is provided in parallel with the rotating axis on the periphery of the rotatable body.

Figure 2:
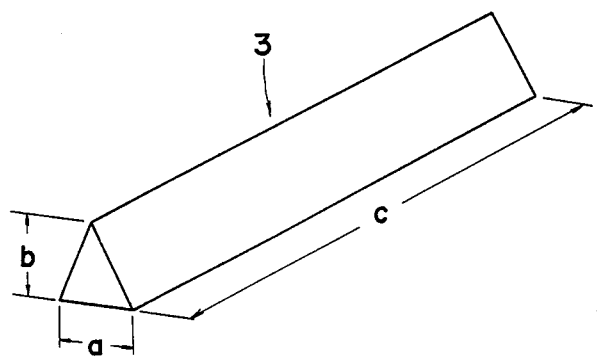
FIG. 2 is a perspective view showing an example of a blade provided on the periphery of the rotatable blade-grinder illustrated in FIG. 1.

FIG. 2 shows an example of the blade provided on the periphery of the rotatable body.

As shown in FIG. 2, a blade 3 is generally in the form of triangular prism having a vertical section of triangle.

The size of the blade can be appropriately determined according to the size of the rotatable body, the number of the blade provided on the periphery of the rotatable body, etc., and the blade generally has a length of the base side (a in FIG. 2) ranging from 0.5 to 10 mm and a height (b in FIG. 2) ranging from 3 to 10 mm. The length of the blade (c in FIG. 2) is generally determined corresponding to the length of the rotatable body.

The blade has a function of grinding or shaving the surface of the magnetic recording layer of the recording medium, so that it is preferably made of a material having a hardness similar to or higher than the component contained in the magnetic recording layer. Examples of the material of the blade include sapphire, alumina, cermet, zirconia (zirconium oxide), silicon nitride, silicon carbide, diamond and other hard material. Preferred is sapphire.

The blade 3 is fixed on the periphery 2 of the rotatable body along the rotation axis of the body, for example, by means of a screw.

Figure 3:
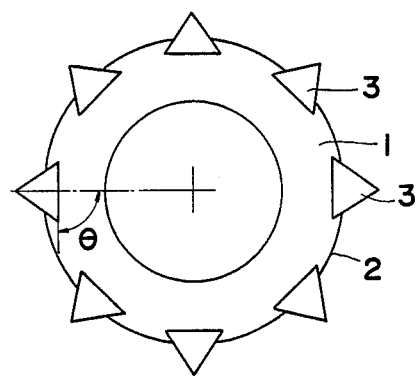
FIG. 3 is a sectional view of the rotatable blade-grinder illustrated in FIG. 1.

FIG. 3 is a sectional view of the rotatable blade-grinder according to the invention.

As illustrated in FIG. 3, the blade 3 is preferably arranged in such a manner that an angle $\theta$ between an imaginary line connecting from the top of the blade 3 and the central point of rotation of the device and the base side of the blade would be in the range of 30° to 150°. When grinding the back layer, the angle $\theta$ is preferably smaller than that of a rotatable blade-grinder used for grinding the magnetic recording layer. Because the back layer is thinner than the magnetic recording layer and hence the magnetic recording layer is liable to be excessively ground when the angle $\theta$ is too large. Further, the top of the blade is protruded at a height of generally not less than 1 mm, preferably not less than 2 mm, from the surface of the rotatable body.

The grinding process of the magnetic recording layer or the back layer using the above-mentioned rotatable blade-grinder is generally done by running the magnetic recording layer or the back layer to be ground and bringing the surface of the recording layer or the back layer into contact with the grinder under rotation. That is, the surface of the magnetic recording layer or the back layer is preferably brought into contact with the blade under the condition that the laminated sheet having the magnetic recording layer and/or the back layer is forced to run at a speed of 60–1,200 m/min., providing a tension of 30–100 g/8 mm to the sheet in the longitudinal direction of the sheet.

In the grinding process, the rate of rotation of the rotatable blade-grinder in contact with the recording layer or the back layer is generally set to 100 to 6,000 r.p.m., preferably 150 to 500 r.p.m. In the case of grinding the surface of the back layer, the rate of rotation is preferably less than that in the case of grinding the surface of the magnetic recording layer, whereby the surface of the back layer is not excessively smoothened and hence high running properties of the magnetic recording medium can be kept. The contact angle (wrap angle) between the magnetic recording layer and the grinder is generally set to 30°–180°, preferably 30°–120°.

The rotatable blade-grinder is preferably rotated in a direction opposite to the running direction of the magnetic recording layer, whereby the grinding effect can be enhanced.

In the case of using a sapphire blade (fixed blade), the grinding process is generally done by setting an angle between the rake face of the blade and the magnetic recording layer or the back layer moving against the blade to 30°–120°, and running the laminated sheet at a speed of 60–1,200 m/min., providing a tension of 30–100 g/8 mm to the sheet in the longitudinal direction of the sheet in such a manner that the sapphire blade is brought into contact with the surface of the magnetic recording layer or the back layer. In the process, at least one blade is brought into contact with the magnetic recording layer or the back layer. In general, a set of 2–8 blades is employed.

In the case of using the diamond wheel, the grinding process is generally done by setting the rotation rate of the diamond wheel and a contact angle of the wheel and the magnetic recording layer or the back layer to 300–6,000 rpm and 30°–120°, respectively, and running the laminated sheet at a speed of 60–1,200 m/min., providing such a tension of 30–100 g/8 mm to the sheet in the longitudinal direction of the sheet in such a manner that the diamond wheel is brought into contact with the surface of the magnetic recording layer or the surface of the back layer. The diamond wheel is preferably rotated in a direction opposite to the running direction of the laminated sheet, whereby the grinding can be performed efficiently.

Grinding of the magnetic recording layer can be performed before or after grinding the back layer.

By the above-mentioned grinding process, particles of the ferromagnetic powder or abrasive protruded from the surface of the magnetic recording layer, unreacted curing agent present on the surface of the recording layer, and further a deposit (e.g., dust deposited onto the surface of the magnetic recording layer in the preparation of the magnetic recording medium) are ground away from the surface of the recording layer generally with the binder present in the vicinity of the surface of the recording layer (generally 0.01–5 $\mu$m depth from the surface), whereby the surface of the magnetic recording layer is very smoothened. Moreover, since the amount of particles of ferromagnetic powder and abrasive easily dropping off from the surface of the recording layer decreases by grinding the surface of the recording layer, occurrence of drop-out or clogging on a magnetic head caused by the deposited particles can be reduced. In addition, the resulting recording medium hardly decreases in the electromagnetic conversion characteristics even after running of long period of time, because the ferromagnetic powder hardly drops off from the magnetic recording layer in the course of running procedure.

By subjecting the surface of the back layer to the grinding process, particles of the nonmagnetic powder hardly drop off from the back layer, and accordingly the resulting magnetic recording medium in the form of tape does not suffer from occurrence of drop-out or clogging on a magnetic head caused by the deposition of the separated particles from the back layer when the medium is stored in the wound state.

After the grinding process, the surface of the magnetic recording layer and the surface of the back layer are preferably subjected to a wiping treatment. Through the wiping treatment, a dust given by the grinding process is thoroughly removed away from the surface of the magnetic recording layer or the back layer, and the resulting magnetic recording medium is prominently reduced in occurrence of drop-out.

Examples of the wiping materials employable in the invention include a suede-type nonwoven fabric and a bonded fabric. The suede-type nonwoven fabric is a fabric of single layer structure not containing a binder such as polyurethane in which bundles of polyester fiber of 0.01 to 0.09 denier are finely interlocked (e.g., Exceine, trade name of Toray Industries, Inc.). The bonded fabric is a fabric in which polyester fiber is bonded with a binder such as polyurethane (e.g., Vilene, trade name of Japan Vilene Co., Ltd). Preferably used in the invention is the suede-type nonwoven fabric.

A method comprising subjecting the laminated sheet to surface smoothening treatment, cutting the sheet, and grinding the surface of the magnetic recording layer and the surface of the back layer, by bringing a rotating blade-grinder into contact with the magnetic recording layer and the back layer, in this order, is described above, but this order is given by no means to restrict the process of the invention. For instance, as described hereinbefore, a process comprising a step for cutting or slitting and a step for contacting (grinding) performed at the same place, or a method comprising a step for grinding arranged prior to the cutting or slitting process can be also utilized.

Further, even when the aforementioned curing treatment is not done, the curing reaction of the curing agent with the resin component proceeds, though its curing rate is very low, so that the cutting process and the grinding process can be carried out after the surface smoothening process without performing the curing treatment.

The examples and the comparison examples of the present invention are given below. In the following examples, the expression "part(s)" means "part(s) by weight", unless otherwise specified.

EXAMPLE 1

The components for a magnetic paint indicated below were kneaded in a ball mill to give a magnetic paint.

| | |
|---|---|
| Ferromagnetic metal alloy powder (Fe—Ni alloy, Fe: 96 wt. %, Ni: 4 wt. %, specific surface area: 45 m$_2$/g, | 100 parts |
| Vinyl chloride/vinyl acetate/maleic anhydride copolymer (400 × 100 A, available from Nippon Zeon Co., Ltd., Japan) | 14 parts |
| Polyurethane resin (Niporan N-2304, available from Nippon Polyurethane Co., Ltd., Japan) | 12 parts |
| Polyisocyanate compound (Desmodule L-75, available from Bayer AG) | 12 parts |
| α-Alumina | 10 parts |
| Stearic acid | 5 parts |
| Butyl stearate | 5 parts |
| Carbon black | 1 part |
| Methyl ethyl ketone | 325 parts |

The obtained magnetic paint was adjusted on its viscosity, and then the magnetic paint was coated over a polyethylene terephthalate support (thickness: 10 μm) by means of a reverse roll in such a manner that the coated layer of the magnetic paint would have thickness of 3.0 μm (after dryness).

Independently, the components of a coating solution of a back layer given below were homogeneously kneaded in a ball mill to give a coating solution for a back layer.

| | |
|---|---|
| Carbon black (mean particle size: 0.05 μm) | 35 parts |
| α-Alumina (mean particle size: 0.15 μm, maximum particle size: 0.3 μm) | 1.8 parts |
| Nitrocellulose | 20 parts |
| Polyurethane resin (Niporan N—2304, available from Nippon Polyurethane Co., Ltd., Japan) | 10 parts |
| Polyisocyanate compound (Colonate L, available from Nippon Polyurethane Co., Ltd., Japan) | 10 parts |
| Methyl ethyl ketone | 600 parts |

The obtained coating solution was adjusted in its viscosity, and then the solution was coated over a back surface of the polyethylene terephthalate support having a coated layer of magnetic paint on other surface by means of a reverse roll in such a manner that the coated layer of the solution would have thickness of 0.7 μm (after dryness).

The nonmagnetic support having the coated layer of the magnetic paint and the coated layer of the solution for a back layer thereon was treated with an electromagnet at 3,000 gauss under wet condition to give magnetic orientation. After the coated layers were dried, the dried layer of the magnetic paint was subjected to supercalendering to give a laminated sheet comprising a magnetic recording layer, a nonmagnetic support and a back layer.

The laminated sheet was heated at 60° C. for 24 hours to cure the polyisocyanate compound contained in the magnetic recording layer, and the heated sheet was then slit into a width of 8 mm. Subsequently, the slit sheet was successively subjected to the following grinding treatment using a rotatable blade-grinder and a wiping treatment using a suede-type nonwoven fabric in which bundles of polyester fiber of 0.1 to 0.9 denier were interlocked (Exceine, trade name of Toray Industries, Inc.), to prepare an 8 mm type video tape.

The grinding treatment using a rotatable blade-grinder was carried out as follows.

A rotatable blade-grinder comprising a metal cylinder (length: 35 mm, outer diameter: 20 mm, inner diameter: 12 mm) and one sapphire blade having a length of 35 mm and a section of regular triangle (length of side: 5 mm) provided on the periphery of the cylinder at an angle of 65° was prepared.

The rotatable blade-grinder was rotated at 1,000 r.p.m. in the opposite direction to the running direction of the magnetic recording layer, and brought into contact with the recording layer of the laminated sheet at a contact angle of the grinder and the sheet of 80°, providing tension of 50 g/8 mm to the sheet, to grind the surface of the magnetic recording layer.

The video tape was run on a commerically available 8 mm type-tape recorder (FUJIX-8, trade name of Fuji Photo Film Co., Ltd.), and measured on the number of drop-out at 15 μs and −18 dB within one minute.

Independently, the video tape was run in the above-mentioned tape recorder at a normal speed for 90 min., to measure the number of instantaneous clogging.

Further, the obtained video tape was examined on lowering of the reproduction video output. The examination of the lowering was done by repeatedly running the video tape as much as 10 times in the aforementioned tape recorder and measuring the reproduction video output at the time when the 10 time-repeated running was finished. The measured reproduction video output was expressed by a relative value when the reproduction video output after the first running of the tape was set to 0 dB.

The results on the number of drop-out, the number of times of instantaneous clogging taking place on the magnetic head, and the lowering of video output are set forth in Table 1.

COMPARISON EXAMPLE 1

The procedure of Example 1 was repeated except for not subjecting the surface of the magnetic recording layer to the grinding treatment using the rotatable blade-grinder to prepare an 8 mm type video tape.

The obtained video tape was examined on the number of drop-out, the number of times of instantaneous clogging, and the lowering of video output according to the above-mentioned tests.

The results are set forth in Table 1.

COMPARISON EXAMPLE 2

The procedure of Example 1 was repeated except for performing the following grinding treatment using a known sapphire blade (fixed blade-grinder) in place of the grinding treatment using the rotating blade-grinder, to prepare an 8 mm type video tape.

A sapphire blade (width: 5 mm, length: 35 mm, available from Kyosera Co., Ltd.) having an angle of tip portion (made of sapphire) of 60° was brought into contact with the surface of the running magnetic recording layer at contact angle therebetween of 80° under tension of 50 g/8 mm applied to the tape, to grind the surface of the magnetic recording layer. The contact of the sapphire blade with the magnetic recording layer was carried out once, using a set of four sapphire blades.

The obtained video tape was examined on the number of drop-out, the number of times of instantaneous clogging, and the lowering of video output according to the above-mentioned tests.

The results are set forth in Table 1.

TABLE 1

|  | Drop-out (particles/min.) 15 μs, −18 dB | Instantaneous Clogging (number of times) | Reproduction Video Output (dB) |
| --- | --- | --- | --- |
| Example 1 | 10 | 1-3 | −1 |
| Com. Ex. 1 | 150 | great number | −6 |
| Com. Ex. 2 | 15 | 4-6 | −4 |

In Table 1, the expression "great number" means that times of a great number of clogging take place on the magnetic head and that such a clogging as not removable by the running procedure of the magnetic recording medium takes place on the head so as not to measure the number of times of instantaneous clogging.

EXAMPLE 2

The procedure of Example 1 was repeated except for further subjecting the surface of the back layer to the following grinding treatment using a rotatable blade-grinder after the grinding treatment of the surface of the magnetic recording layer and a wiping treatment to thus treated back layer using the same wiping material as used for wiping the surface of the magnetic recording layer in Example 1, to prepare an 8 mm type video tape.

The grinding treatment of the back layer using a rotatable blade-grinder was carried out as follows.

A rotatable blade-grinder comprising a metal cylinder (length: 35 mm, outer diameter: 20 mm, inner diameter: 12 mm) and two sapphire blades having a length of 35 mm and a section of regular triangle (length of side: 5 mm) provided on the periphery of the cylinder at an angle of 115° was prepared.

The rotatable blade-grinder was rotated at 200 r.p.m. in the opposite direction to the running direction of the laminated sheet, and brought into contact with the back layer at a contact angle of the grinder and the back layer of 120°, providing tension of 50 g/8 mm to the sheet, to grind the surface of the back layer.

The obtained video tape was examined on the number of drop-out, the number of times of instantaneous clogging, and the lowering of video output according to the above-mentioned tests.

The results are set forth in Table 2.

EXAMPLE 3

The procedure of Example 2 was repeated except for performing the grinding treatment of the surface of the back layer prior to the grinding treatment of the surface of the magnetic recording layer, to prepare an 8 mm type video tape.

The obtained video tape was examined on the number of drop-out, the number of times of instantaneous clogging, and the lowering of video output according to the above-mentioned tests.

The results are set forth in Table 2.

EXAMPLE 4

The procedure of Example 2 was repeated except for subjecting the surface of the magnetic recording layer to the following grinding treatment using a sapphire blade (fixed blade) instead of the grinding treatment using the rotatable blade-grinder, to prepare an 8 mm type video tape.

A sapphire blade (width: 5 mm, length: 35 mm, available from Kyosera Co., Ltd.) having an angle of tip portion (made of sapphire) of 60° was brought into contact with the surface of the magnetic recording layer at an angle of 80° defined between the rake face of the magnetic layer surface of the video tape moving at a speed of 420 m/min relative to the blade under tension of 50 g/8 mm applied to the tape, to shave the surface of the magnetic recording layer. The contact of the sapphire blade with the magnetic recording layer was carried out once, using a set of four sapphire blades.

The obtained video tape was examined on the number of drop-out, the number of times of instantaneous clogging, and the lowering of video output according to the above-mentioned tests.

The results are set forth in Table 2.

EXAMPLE 5

The procedure of Example 4 was repeated except for performing the grinding treatment of the surface of the back layer using the rotatable blade-grinder prior to the grinding treatment of the surface of the magnetic recording layer using the fixed blade grinder comprising four sapphire blades, to prepare an 8 mm type video tape.

The obtained video tape was examined on the number of drop-out, the number of times of instantaneous clogging, and the lowering of video output according to the above-mentioned tests.

The results are set forth in Table 2.

COMPARISON EXAMPLE 3

The procedure of Example 4 was repeated except for not performing the grinding treatment of the surface of the back layer using the rotatable blade-grinder to prepare an 8 mm type video tape.

The obtained video tape was examined on the number of drop-out, the number of times of instantaneous clogging, and the lowering of video output according to the above-mentioned tests.

The results are set forth in Table 2.

COMPARISON EXAMPLE 4

The procedure of Example 2 was repeated except for not performing any grinding treatment of the surface of the magnetic recording layer and the surface of the back layer and any wiping treatment of the surface of the magnetic recording layer and the surface of the back layer, to prepare an 8 mm type video tape.

The obtained video tape was examined on the number of drop-out, the number of times of instantaneous clogging, and the lowering of video output according to the above-mentioned tests.

The results are set forth in Table 2.

TABLE 2

|  | Drop-out (particles/min.) 15 μs, −18 dB | Instantaneous Clogging (number of times) | Reproduction Video Output (dB) |
| --- | --- | --- | --- |
| Example 2 | 2 | none | 0 |
| Example 3 | 2 | none | 0 |
| Example 4 | 5 | none | −2 |
| Example 5 | 5 | none | −2 |
| Com. Ex. 3 | 15 | 1–3 | −4 |
| Com. Ex. 4 | 100 | great number | −6 |

In Table 2, the expression "great number" means that times of a great number of clogging take place on the magnetic head and that such a clogging as not removable by the running procedure of the magnetic recording medium takes place on the head so as not to measure the number of times of instantaneous clogging.

We claim:

1. A process for the preparation of a magnetic recording medium which comprises the steps of subjecting a magnetic recording layer coated on a nonmagnetic support to surface smoothening treatment, said magnetic recording layer comprising a ferromagnetic powder dispersed in a binder, and grinding the smoothened surface of the magnetic recording layer and a surface of back layer provided on another surface of the nonmagnetic support by means of a grinder made of a material of high hardness and selected from the group consisting of a fixed blade, a diamond wheel and a rotatable blade.

2. The process as claimed in claim 1, wherein the magnetic recording layer is ground by bringing the surface of the recording layer into contact with the grinder under rotation under the condition that the magnetic recording layer runs in a direction opposite to the rotation of the grinder.

3. The process as claimed in claim 1, wherein the back layer is ground by bringing the surface of the back layer into contact with the grinder under rotation under the condition that the back layer run in a direction opposite to the rotation of the grinder.

4. The process as claimed in claim 1, wherein the surface of the back layer is wiped after grinding the back layer.

5. The process as claimed in claim 4, wherein the blade is made of a material selected from the group consisting of sapphire, alumina, cermet, zirconia, silicon nitride, silicon carbide, and diamond.

6. The process as claimed in claim 1, wherein said rotatable blade-grinder comprises a rotatable body having a circular section and at least 1 blade provided on the periphery of said body.

7. The process as claimed in claim 1, wherein said rotatable blade-grinder comprises a rotatable body having a circular section and 2 to 32 blades provided on the periphery of said body.

8. The process as claimed in claim 1, wherein said rotatable blade-grinder grinds at least either said surface of the recording layer or said surface of the back layer.

* * * * *